US011890646B2

(12) United States Patent
Esbelani

(10) Patent No.: US 11,890,646 B2
(45) Date of Patent: Feb. 6, 2024

(54) DISC, SPACER AND TRANSPORTATION ASSEMBLY

(71) Applicant: SANDVIK SRP AB, Svedala (SE)

(72) Inventor: Hodin Esbelani, Trelleborg (SE)

(73) Assignee: SANDVIK SRP AB, Svedala (SE)

( * ) Notice: Subject to any disclaimer, the term of this patent is extended or adjusted under 35 U.S.C. 154(b) by 122 days.

(21) Appl. No.: 17/609,436

(22) PCT Filed: May 10, 2019

(86) PCT No.: PCT/EP2019/062039
§ 371 (c)(1),
(2) Date: Nov. 8, 2021

(87) PCT Pub. No.: WO2020/228924
PCT Pub. Date: Nov. 19, 2020

(65) Prior Publication Data

US 2022/0226863 A1 Jul. 21, 2022

(51) Int. Cl.
*B07B 1/15* (2006.01)
*B07B 1/46* (2006.01)

(52) U.S. Cl.
CPC .............. *B07B 1/15* (2013.01); *B07B 1/4609* (2013.01)

(58) Field of Classification Search
CPC .. B07B 1/14; B07B 1/145; B07B 1/15; B07B 1/155; B07B 13/072; B02C 4/30; B02C 4/305; B02C 2013/28663
USPC .................................................. 209/671–673
See application file for complete search history.

(56) References Cited

U.S. PATENT DOCUMENTS 4,219,291 A * 8/1980 Hoeh ...................... B23P 15/28
76/115
4,557,388 A 12/1985 Peterson
4,795,036 A 1/1989 Williams
4,901,863 A * 2/1990 Lancaster ............. D21B 1/023
209/672

(Continued)

FOREIGN PATENT DOCUMENTS

DE 29803876 U1 5/1998
DE 102014220830 B3 * 11/2015 ............... A01F 7/02

(Continued)

OTHER PUBLICATIONS

SANDVIK: "Hx900 cast-in-carbide", Internet Citation, Feb. 1, 2008, pp. 1-8, XP002721270. Retrieved from the internet: URL: http://www.miningandconstruction.sandvik.com/sandvik/0120/Internet/global/S003713.nsf/Alldocs/ Portals*5CProducts*5CConveyors*and*conveyor*components*2AWear*protection/$file/HX900_brochure_lowres/pdf.

*Primary Examiner* — Terrell H Matthews
(74) *Attorney, Agent, or Firm* — Corinne R. Gorski

(57) ABSTRACT

A disc and spacer for transporting materials on a roller screen. The disc includes a circular main body and a wear resistant portion. The circular main body has a centrally arranged opening, through which opening a centrally arranged imaginary axis extends. The wear resistant portion is arranged around the circular main body and includes a plurality of protuberances that are circumferentially arranged along the periphery of the wear resistant portion and which, project radially outward from the main body. The wear resistant portion has a first material and the main body has a second material, the first and second materials having different wear resistant properties.

17 Claims, 11 Drawing Sheets

(56) References Cited

U.S. PATENT DOCUMENTS

| | | | | | |
|---|---|---|---|---|---|
| 5,163,564 | A * | 11/1992 | Matula | B07B 1/15 | 209/672 |
| 5,188,303 | A * | 2/1993 | Hoof | B02C 13/28 | 241/300 |
| 8,646,615 | B2 * | 2/2014 | Bruggencate | B07B 1/4618 | 209/672 |
| 9,238,254 | B1 * | 1/2016 | Davis | B07B 1/15 | |
| 11,596,981 | B2 * | 3/2023 | Tuttle | B07B 1/155 | |
| 2011/0094944 | A1 * | 4/2011 | Bruggencate | B07B 1/4618 | 209/351 |
| 2013/0139336 | A1 * | 6/2013 | Guenther | B07B 1/528 | 15/160 |
| 2014/0202933 | A1 | 7/2014 | Benjamins | | |
| 2017/0304868 | A1 * | 10/2017 | Parr | D21D 5/046 | |
| 2018/0178253 | A1 | 6/2018 | Tuttle | | |

FOREIGN PATENT DOCUMENTS

| | | | | |
|---|---|---|---|---|
| EP | 0861696 | A1 * | 2/1998 | |
| EP | 0861696 | A1 * | 9/1998 | |
| EP | 0861696 | A1 | 9/1998 | |
| EP | 2223587 | A1 | 9/2010 | |
| EP | 2873462 | A1 * | 5/2015 | B02C 13/1807 |
| WO | 940227 | A1 | 9/1994 | |
| WO | WO-9420227 | A1 * | 9/1994 | B07B 1/15 |
| WO | WO-2020228924 | A1 * | 11/2020 | B07B 1/15 |

* cited by examiner

DISC, SPACER AND TRANSPORTATION ASSEMBLY

RELATED APPLICATION DATA

This application is a § 371 National Stage Application of PCT International Application No. PCT/EP2019/062039 filed May 10, 2019.

TECHNICAL FIELD

The present disclosure relates to a disc, a spacer, and a transportation assembly arranged to cooperate for transporting materials on a roller screen and in particular, although not exclusively to a disc and a spacer having wear resistant areas to contact the materials for transportation.

BACKGROUND

A roller screen is a type of heavy machinery equipment for screening/sorting feed materials, e.g., coal. The transportation system of the roller screen is highly exposed to the feed materials, as the transportation system comes into contact with the feed materials and transports the materials in a rotating way. Such sorting screens are known from US20140202933 and WO9420227A1. In U.S. Patent Publication US20140202933, a sorting screen comprising a row of rotatable, driven shafts mutually spaced in a conveying direction is described. Each of the shaft carries a row of radially extending rotor bodies for intermittently urging material on the sorting screen upward and in a conveying direction. The rotor bodies of each of the rows are mutually spaced in a longitudinal direction of the respective shaft by spacers, and each spacer is a tubular spacer and each rotor body is provided with a number of projections retaining a respective end face of a respective tubular spacer. In the International Patent Publication WO9420227A1, a roller screen with a plurality of parallel shafts, each having a plurality of circular discs that are separated by spacers is described. The discs are eccentrically mounted on the respective shafts, and the discs on each shaft have an eccentricity that is circumferentially offset from disc to disc. The spacers are made of rubber and are concentric with respective shafts.

Since discs and the spacers are wear parts, after having been used for a certain period of time, worn out discs or spacers need to be replaced with a new one.

SUMMARY

It is an objective of the present invention to provide a disc and a spacer that cooperate for transporting materials on a roller screen. The disc and the spacer should be wear resistant against the feed materials and preferably have increased wear resistant properties at the high wear zone. It is a further specific objective to provide a disc and a spacer that are optimised to be integrated respectively, to particularly increase the service lifetime of the disc and the spacer.

The objectives are achieved by providing a disc having a circular main body and a wear resistant portion arranged around the main body. The wear resistant portion comprises a first material, and the main body comprises a second material that has a different wear resistant property from the first material. Such a configuration is cost efficient, while the wear resistance of the disc is increased. In particular, a plurality of protuberances is arranged circumferentially along the periphery of the wear resistant portion to contact the feed materials, to optimise the wear resistance and the transfer of feed materials. The objectives are further achieved by providing a spacer having a cylindrical main body and at least one ridge, wherein the ridge comprises a third material, and the main body comprises the third material or a fourth material having a different wear resistant property than the third material. Such a configuration is cost efficient and increases the wear resistance of the spacer. In particular, the spacer and the disc are arranged to cooperate to transport the feed materials on a roller screen, to be specific, a plurality of discs and a plurality of spacers are installed one by one on each of a plurality of shafts in parallel on the roller screen, the discs and spacers are further rotated together with the shafts being driven by the roller screen, so as to roll the feed materials and further transport the material in a desired way.

According to a first aspect of the present invention there is provided a disc arranged for cooperating with a spacer for transporting materials on a roller screen, the disc comprising: a circular main body having a centrally arranged opening, through which opening a centrally arranged axis extends; and a wear resistant portion arranged around the circular main body, the wear resistant portion comprises a plurality of teeth which are circumferentially arranged along the periphery of the wear resistant portion and project radially outward from the main body; characterised by: the wear resistant portion comprises a first material, the main body comprises a second material, and the first and second materials have different wear resistant properties.

Optionally, the wear resistance of the first material is higher than that of the second material. Such a configuration is cost efficient, as the wear resistant portion includes a high wear resistant zone as compared to the circular main body of the disc.

Optionally, the first material is bonded with the second material so that the wear resistant portion and the main body are integrated. Such a configuration further improves the wear resistance of the disc as an integrated piece has higher wear resistance and a longer life of service.

Optionally, the second material comprises a matrix material, and the first material comprises cemented carbides metallurgically bonded to the matrix material. Advantageously, the disc is an integrated piece given that the wear resistant portion and the main body are metallurgical bonded. In another embodiment, the first material further comprises the matrix material, such that the cemented carbides and the matrix materials in the wear resistant portion are metallurgically bonded, and the wear resistant portion is further integrated with the main body.

Optionally, the cemented carbides in the wear resistant portion can be in a form of a plurality of segments arranged on the radially outermost region of the teeth. In this configuration, the teeth are made of the matrix material and the segments are made of the cemented carbides that are metallurgically bonded to the teeth.

Optionally, the cemented carbides in the wear resistant portion can be in at least one of the forms: granules, balls, and/or cubes, metallurgically bonding to the matrix material in the wear resistant portion.

The metallurgical bonding within the wear resistant portion increases the wear resistance thereof. And the configuration of using the cemented carbide granules, balls, and/or cubes, further increases the contact area between the cemented carbides and the matrix material in the wear resistant portion, which increases the metallurgical bonding. Advantageously, such configuration largely increases the wear resistance of the wear resistant portion.

Optionally, the matrix material comprises iron. And more preferably, the iron is spheroidal cast iron or high-chromium iron. The metallurgical bonding between the cemented carbides and spheroidal cast iron (or high-chromium iron) are known to be rather strong, and thus advantageously, the wear resistance of the disc is enhanced.

According to a second aspect of the present invention there is provided a spacer arranged to cooperate with the disc for transporting materials on a roller screen, the spacer comprising: a cylindrical main body having an outer surface and a centrally arranged passage, through which passage a centrally arranged imaginary axis extends; and at least one ridge extending axially and/or radially on the outer surface of the main body, characterised by: the ridge comprises a third material, the main body comprises the third material or a fourth material, the third and fourth materials have different wear resistant properties.

Optionally, the wear resistance of the third material is higher than that of the fourth material, and more preferably, the third material is bonded with the fourth material so that the main body and the ridge are integrated. Such configuration improves the wear resistance of the spacer as an integrated piece.

Optionally, the fourth material comprises a matrix material, and the third material comprises cemented carbides that are metallurgically bonded to the matrix material. The matrix material comprises iron, and in one embodiment, the iron is spheroidal cast iron or high-chromium iron. Such configuration creates strong metallurgical bonding between the ridge and the main body, and further creates a strong metallurgical bonding within the main body. Thus, the wear resistance of the spacer is increased, and the service life of the spacer is thus prolonged.

Optionally, the main body comprises at least two elements that are made of the third material. The elements are located on top of one another so as to form the main body in a cylindrical shape. More preferably, one of the elements comprises a protrusion projecting axially to sit on the next one of the elements, to allow for the two adjacent elements to be spaced apart so as to let the fourth material to fit in between. With the fourth material fit in between the elements to contact with the top/bottom surfaces of the two elements, metallurgical bonding is created between the two elements. Such a configuration of having multiple elements set on top of each other increases the area of contact of the third and fourth material, and thus increases the metallurgical bonding in-between.

Optionally, each of the elements comprises a side protrusion protruding radially outward of the outer surface, wherein the side protrusion forms at least partial the ridge on the outer surface of the main body. The ridge is configured for contacting with the feed materials on the roller screen. Such a configuration of having the side protrusions of the elements forming the ridge enables the ridge to be further integrated with the main body. The ridge is made of the third material, and it is further formed by the side protrusions metallurgically bonding with the fourth material, such that the third and fourth materials in the ridge are metallurgically bonded to be more wear resistant.

Optionally, the spacer further comprises an extending portion extending axially from a first axial end or a second axial end of the main body, the extending portion being generally cylindrical and made of the fourth material. Such a configuration enables the spacer to be used in various applications. In one application scenario, where a relatively longer spacer is needed, the spacer includes the extending portion extended axially from the main body.

The extending portion can be made of the fourth material. In another application scenario, end spacers on the shaft of the roller screen may have the extending portion axially longer than the main body of the end spacers, since the end spacers do not contact the feed material as frequently as the intermediate spacers. Advantageously, it is cost efficient to include a high wear resistant part—the main body and include a less wear resistant part—the extending portion, to form the spacer of preferred length.

Optionally, the ridge is further extended axially and/or radially on the extending portion. In this embodiment, the ridge is further increased in length, thus enabling the spacer to be more wear resistant on the extending portion.

Moreover, an axial length of the main body is in a range 25%-100% of the axial length of the spacer. Since the main body is the high wear part of the spacer, by having the main body in the above range of the spacer, it guaranteed a high wear resistance of the spacer and is also cost efficient.

According to a third aspect of the present invention there is provided a roller screen for processing materials comprising: a shaft having a rotational axis; a plurality of the discs, the discs are installed on the shaft through the openings of the discs; and a plurality of the spacers, the spacers are installed on the shaft through the passages of the spacers, each two adjacent discs are separated by one of the spacers.

Preferably, the axis of the discs, the axis of the spacers, and the rotational axis of the shaft are generally coincided, so that the discs and the spacers are located concentrically on the shaft. Such a configuration allows high efficiency for transporting the feed materials as required on the roller screen.

BRIEF DESCRIPTION OF DRAWINGS

A specific implementation of the present invention will now be described, by way of example only, and with reference to the accompanying drawings in which.

DETAILED DESCRIPTION

In the present application, a disc, a spacer, and a roller screen of which a plurality of the discs and spacers are installed on a shaft, are introduced for the purpose of material transportation of the roller screen. Details of the disc, the spacer, and the cooperation between the disc and the spacer are introduced in the following paragraphs.

Figure 1A:
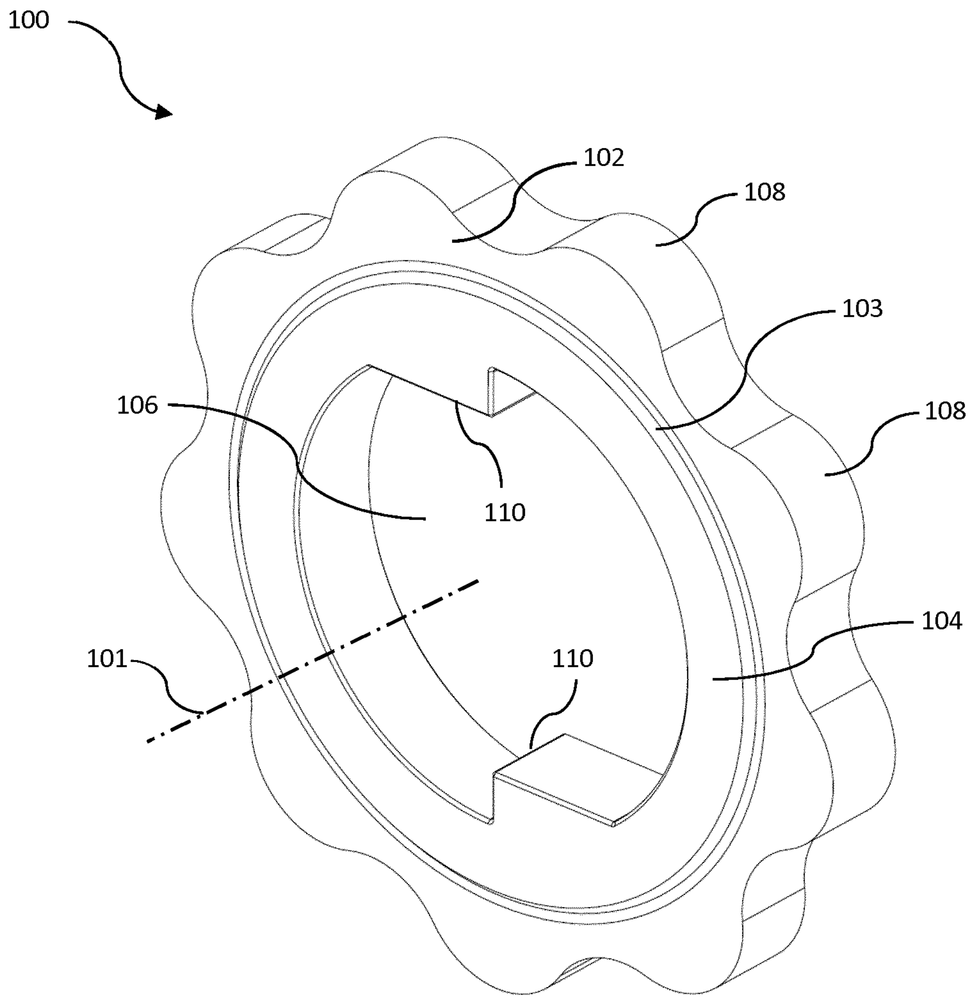
FIG. 1A is a perspective view of a disc of a roller screen according to a specific implementation of the present invention.
Figure 1B:
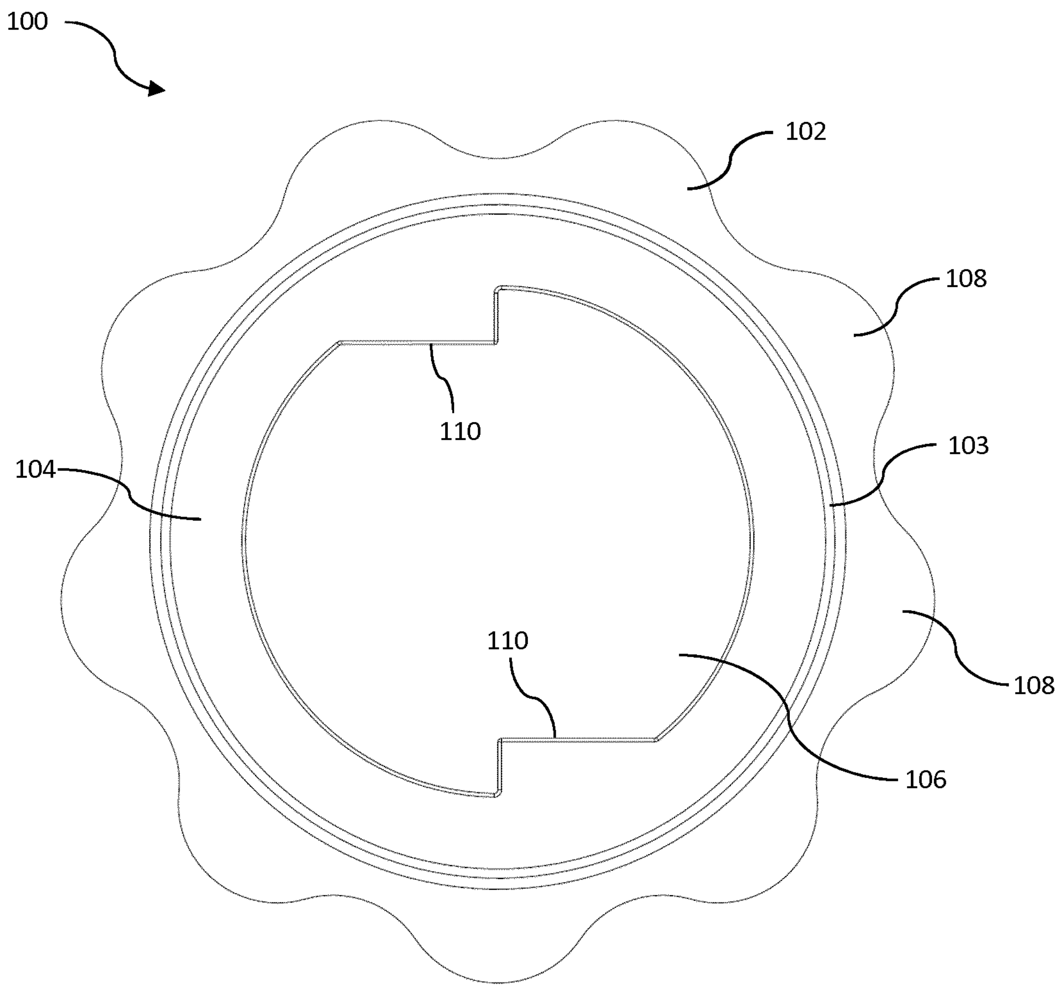
FIG. 1B is a planar view of the disc of FIG. 1A.

FIG. 1A is a perspective view of a disc 100 of a roller screen (not shown) according to a specific implementation of the present invention. FIG. 1B is a planar view of the disc 100. The disc 100 is adapted for cooperation with a spacer (FIG. 3) on the roller screen, the spacer will be later described in more details. The disc 100 includes a circular main body 104 and a wear resistant portion 102, wherein the wear resistant portion 102 includes a first material, and the main body 104 includes a second material that has a different wear resistant property from the first material.

The main body 104 has a centrally arranged opening 106 through which a centrally arranged axis 101 extends, and as shown in FIG. 1A, the main body 104 is generally thicker than the wear resistant portion 102 such that a shoulder 103 is formed between the main body 104 and the wear resistant portion 102. In one embodiment of the present invention, the main body 104 includes at least one projection 110 that projects from the main body 104 and extends axially inside the opening 106. The wear resistant portion 102 is arranged around the main body 104 and comprises a plurality of protuberances 108 which are circumferentially arranged along the periphery of the wear resistant portion 102. The protuberances 108 project radially outward from the main body 104. For example, the protuberances 108 can be similar to the shapes of flower petals, the petals 108 can have a parabolic shape without any angle, as seen in the figures, or the protuberances 108 can be similar to the shapes of teeth, the teeth 108 can be of trapezoidal or other shapes having angles. Thus, it should be appreciated that the term protuberance, petal or teeth shall not be given a strict literal meaning. For instance, the tips of the protuberance 108 which are a radially furthest end of each pedal may form an imaginary circle around the axis 101, and the pits of the protuberance 108 which is radially innermost end of each pedal may form another imaginary circle with a smaller diameter, while the peripheral edge of the protuberance 108, varies back and forth in-between the two imaginary circles in the parabolic shape.

In one embodiment, the disc 100 is installed onto a shaft 802 (FIG. 8) of the roller screen. The shaft is elongate and passes through the opening 106 of the disc 100 based on the cooperation of the projection 110 of the disc 100 and a recess on the shaft which receives the projection 110. The projection 110 further helps to rotate the disc 100 along with the rotation of the shaft. In one embodiment, a plurality of discs 100 are installed onto the shaft with the protuberances 108 of each disc 100 arranged to be in contact with feed materials for transportation. More details will be described further herein in relation to FIGS. 8-9.

According to a specific implementation, the wear resistance of the first material is higher than that of the second material, in such a way that the wear resistant portion 102 is more wear resistant than the main body 104. During operation in the specific implementation, the plurality of protuberances 108 projecting axially outward the wear resistant portion 102 are in close contact with the materials, and the main body 104 is more distant from the feed materials than the wear resistant portion 102. Alternatively, in one embodiment, at least part of the main body 104 is covered by adjacent spacers that cooperate with the discs 100, as will be described further in relation to FIGS. 8-9.

Additionally, according to a specific implementation, the first material is adjoined with the second material so that the wear resistant portion 102 and the main body 104 are integrated. Additionally, the second material includes a matrix material, and the first material includes cemented carbide metallurgically bonded to the matrix material. More specifically, the main body 104 including the matrix material is bonded to the wear resistant portion 102 on the outermost surface (not shown) of the main body 104.

In one embodiment, the peripheral outermost surface of the main body 104, which is generally circular around the axis 101, is the contact surface of the main body 104 and the wear resistant portion 102, and thus provides an area where the cemented carbide and the matrix material are metallurgically bonded. As is well known in the art, the metallurgical bonding between the main body 104 and the wear resistant portion 102 enables the disc 100 to be an integrated part. And advantageously, the integrated disc 100 has improved wear resistance, and thus has a prolonged service life.

In one embodiment of the present invention, the matrix material comprises iron. Additionally, the iron is spheroidal cast iron or high-chromium iron. The metallurgical bonding between iron and cemented carbide are extremely strong as it is well known by the technical person skilled in the art, details of the metallurgical bonding will not be illustrated in detail in this application.

Additionally, according to a specific implementation, the wear resistant portion 102 also includes the matrix material, and additionally, the cemented carbide included in the wear resistant portion 102 is in at least one of the forms of granules, balls, and/or cubes. By way of example, the wear resistant portion 102 includes cemented carbide granules, metallurgically bonded to the matrix material in the wear resistant portion 102. Preferably, the granule size is in a range of 1-15 mm, which provides maximized contact area between the cemented carbide granules with the matrix material, the maximized contact area enables maximized metallurgical bonding in the wear resistant portion 102. The metallurgical bonding in the wear resistant portion 102 allows the disc 100 to be highly wear resistant when encountered with the feed materials on the roller screen, and thus prolongs the service lifespan of the disc 100, which reduces the frequency of replacements and overall cost.

In one embodiment, the wear resistant portion 102 includes iron, and preferably spheroidal cast iron or high-chromium iron. As it is well known by the technical person skilled in the art, the metallurgical bonding between spheroidal cast iron or high-chromium iron, and cemented carbides is extremely strong, and details and properties of the strong bonding will not be further described.

Figure 2:
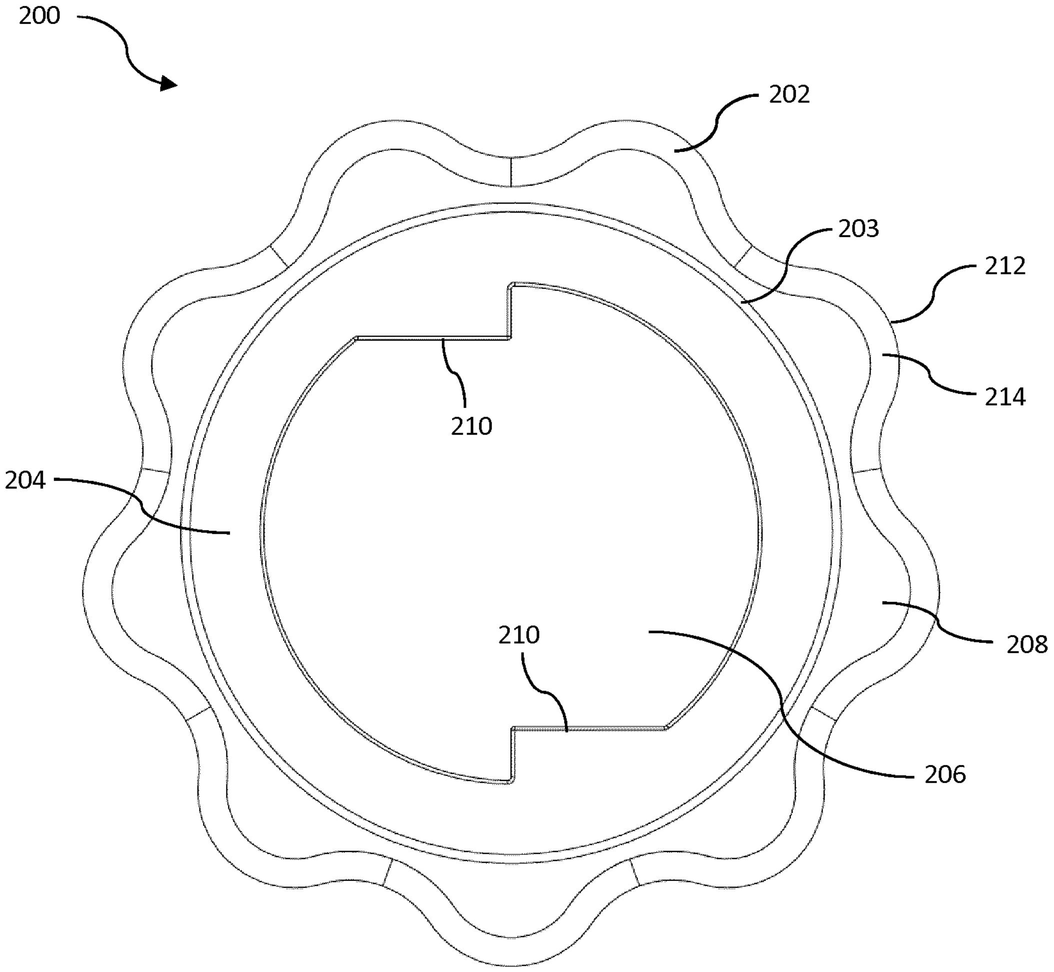
FIG. 2 is a planar view of the disc of a roller screen according to another specific implementation of the present invention.

FIG. 2 is a planar view of the disc 200 of a roller screen according to another specific implementation of the present invention. The disc 200 is similar with the disc 100 as shown in the FIGS. 1A and 1B, thus similar numerals represent similar components having similar functions. The disc 200 includes a circular main body 204 and a wear resistant portion 202. The main body 204 is generally thicker than the wear resistant portion 202 such that a shoulder 203 is formed between the main body 204 and the wear resistant portion 202. The wear resistant portion 202 includes a first material, and the main body 204 includes a second material that has a different wear resistant property than the first material. The main body 204 has a centrally arranged opening 206, and further has at least one projection 210 extending axially inside the opening 206. The wear resistant portion 202 is arranged around the main body 204 and comprises a plurality of protuberances 208 which are circumferentially arranged along the periphery of the wear resistant portion 202. The protuberances 208 project radially outward from the main body 204.

Furthermore, in the embodiment of FIG. 2, the wear resistant portion includes multiple segments 214 arranged on the radially outermost region of the protuberances 208, so to contact with the materials when assembled on the shaft of the roller screen for the transportation of the materials. In this embodiment, the segments 214 generally have the same thickness with the protuberances 208 of the wear resistant portion 202, so that there is no ridge, or protrusion, or shoulder formed between the segments 214 and the protuberances 208. Furthermore, in the embodiment, each segment 214 can correspond to each protuberance 208, however, such is not required.

In another embodiment, more than one segment may correspond to one protuberance 208, or vice versa, i.e., one segment may cover the outermost region of more than one protuberance 208, as long as the segments 214 in combination form a complete protection of the radially outermost region of the protuberances 208.

In the present invention, the segments 214 are made of cemented carbides, the protuberances 208 are made of matrix material, such that the segments 214 are metallurgically bonded to the protuberances 208. For example, the main body 204 and the protuberances 208 of the wear resistant portion 202 are of an integrated piece made of matrix materials. By configuring the segments 214 to be metallurgically bonded to the protuberances 208, the segments 214 are further integrated with the wear resistant portion 202 and the main body 204, so that the disc 200 forms an integrated piece.

In one embodiment, the matrix materials in the main body 204 and the protuberances 208 includes iron, and preferably spheroidal cast iron or high-chromium iron. As is well known by the technical person skilled in the art, the metallurgical bonding between spheroidal cast iron or high-chromium iron, and cemented carbides is extremely strong.

Figure 3:
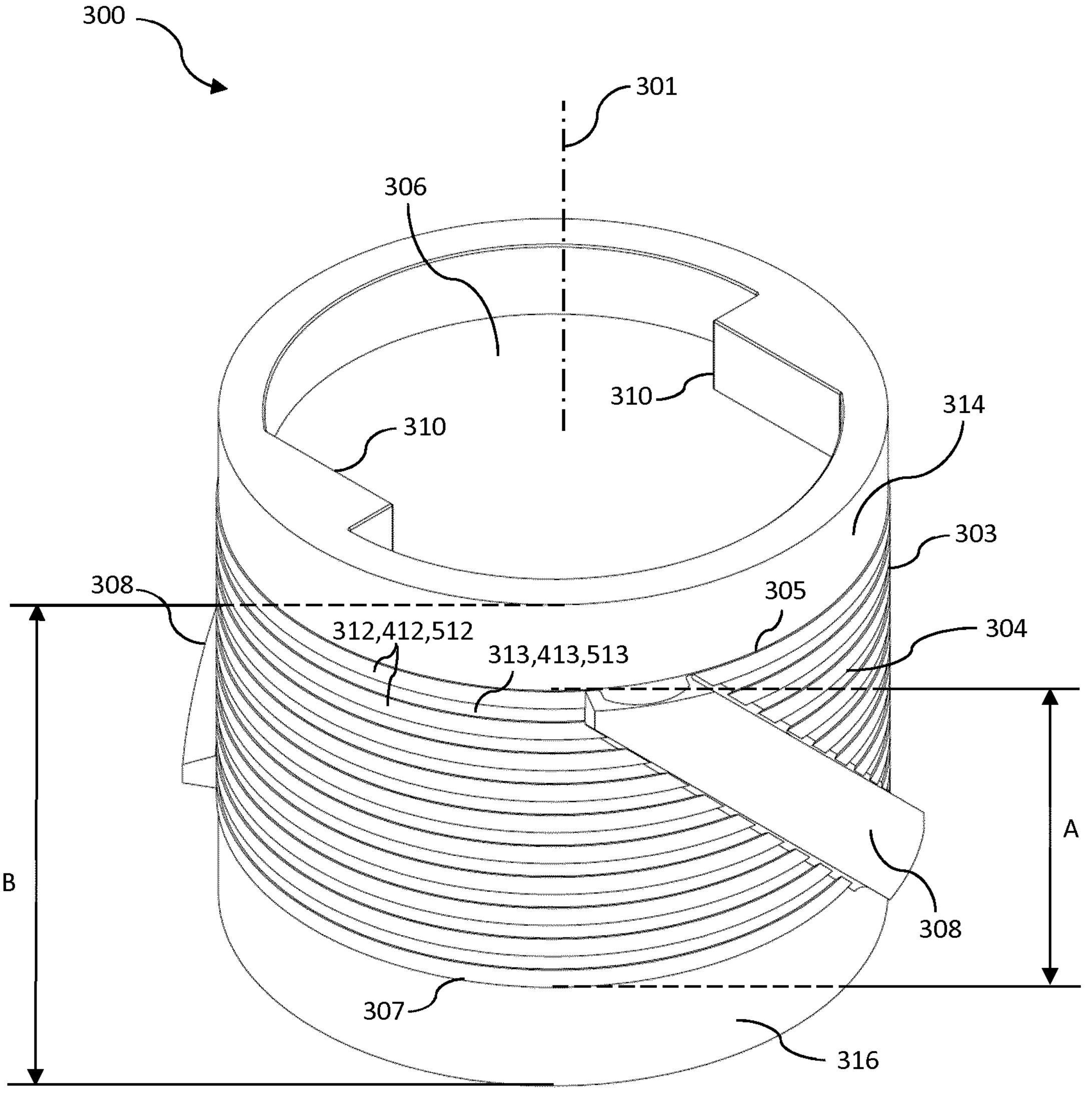
FIG. 3 is a perspective view of a spacer of a roller screen according to a specific implementation of the present invention.

FIG. 3 is a perspective view of a spacer 300 of a roller screen according to a specific implementation of the present invention. The spacer 300 is arranged for cooperation with the disc 100, 200 as mentioned in the above embodiments. The spacer 300 and the disc 100, 200 are cooperating for transporting materials on the roller screen. In one embodiment, the spacer 300 and the disc 100, 200 are installed one by one on the shaft of the roller screen, details of the assembly will be described further in relation to FIGS. 8-9.

Referring to FIG. 3, the spacer 300 comprises a cylindrical main body 304 having an axial length A, and along the axial length A, the main body 304 has an outer surface 303 and a centrally arranged passage 306, through the passage 306 which a centrally arranged axis 301 extends. The spacer 300 further includes at least one ridge 308 extending axially and/or radially on the outer surface 303 of the main body 304. As shown, the spacer 300 includes two ridges 308 extending axially and radially on the opposite sides on the outer surface 303. In one embodiment of the present invention, the main body 304 includes at least one projection 310 that projects from the main body 304 and extends axially inside the passage 306. In one embodiment, the spacer 300 is installed onto the shaft of the roller screen and the projection 310 of the spacer 300 helps to rotate the spacer 300 along with the rotation of the shaft. The spacer 300 and the disc 100, 200 can be both installed on the shaft. The shaft is elongate and passes through the opening 106, 206 of the disc 100, 200 and the passage 306 of the spacer 300, based on the cooperation of the projections 110, 210, 310 and a recess on the shaft that receives the projections 110, 210, 310. The profile of the opening 106, 206 of the disc 100, 200 is similar to the profile of the passage 306 of the spacer 300, and the projections 110, 210 and 310 are of similar shape, to allow the shaft to be assembled with the disc 100, 200 and the spacer 300.

The main body 304 of the spacer 300 comprises a third material and/or a fourth material, and the ridge 308 comprises the third material, wherein the third and fourth materials have different wear resistant properties. The wear resistance of the third material can be higher than that of the fourth material, and the third material is bonded with the fourth material so that the main body 304 and the ridge 308 are integrated.

In one embodiment of the present invention, the third material in the main body 304 is in a form of at least two elements 312, 412, 512 and the fourth material 313, 413, 513 in the main body 304 is fit between the two elements 312, 412, 512, details will be described in relation to FIGS. 4A-4D and FIGS. 5A-5D.

As shown in FIG. 3, the elements 312 are on top of one another so that the main body 304 is cylindrical, and the elements are generally annular when viewed from a direction parallel to the axis 301, e.g., the elements are ring shaped. In a specific embodiment, two adjacent elements 312 are further spaced apart with a certain distance within which the fourth material is fit in and adjoin with the third material of the elements.

In one embodiment, the fourth material comprises a matrix material, and the third material comprises cemented carbides, so that when the matrix material is fit in between the elements 312, the cemented carbides and the matrix material can form an integrated piece by metallurgical bonding at the contact area of the two materials. The metallurgical bonding between the cemented carbides and matrix material is such that the integrated main body 304 has improved wear resistance, and thus with a prolonged service lifetime.

According to a specific implementation, the matrix material comprises iron. Additionally, the iron is spheroidal cast iron or high-chromium iron. The metallurgical bonding between iron and cemented carbides is also extremely strong and as it is well known, details of the bonding will not be described further.

The spacer 300 further includes at least one ridge 308 partially extending axially along the outer surface 303 of the main body 304. The ridge 308 further projects radially from the outer surface 303 to contact with the feed materials on the roller screen. Further details of the ridge 308 will be described in relation to FIGS. 4A-4D and 5A-5D.

The spacer 300 further includes an extending portion 314 and/or 316 extending axially from a first axial end 305 and/or a second axial end 307 of the main body 304, the extending portions 314, 316 being generally cylindrical. The axial length A of the main body 304 can be in a range 25%-100% of an axial length B of the spacer 300 including the main body 304 and the extending portion 314 and/or 316. In one embodiment of the present invention, the axial length A of the main body 304 is about 25% of the axial length B of the spacer 300, when the spacer is arranged as an end spacer installed on the shaft of the roller screen. In another embodiment of the present invention, the axial length A of the main body 304 is more than 25%, e.g., 40%, 50%, or 60%, of the axial length B of the spacer 300, so the spacer is arranged as intermediate spacer installed between the end spacers.

Figure 4A:
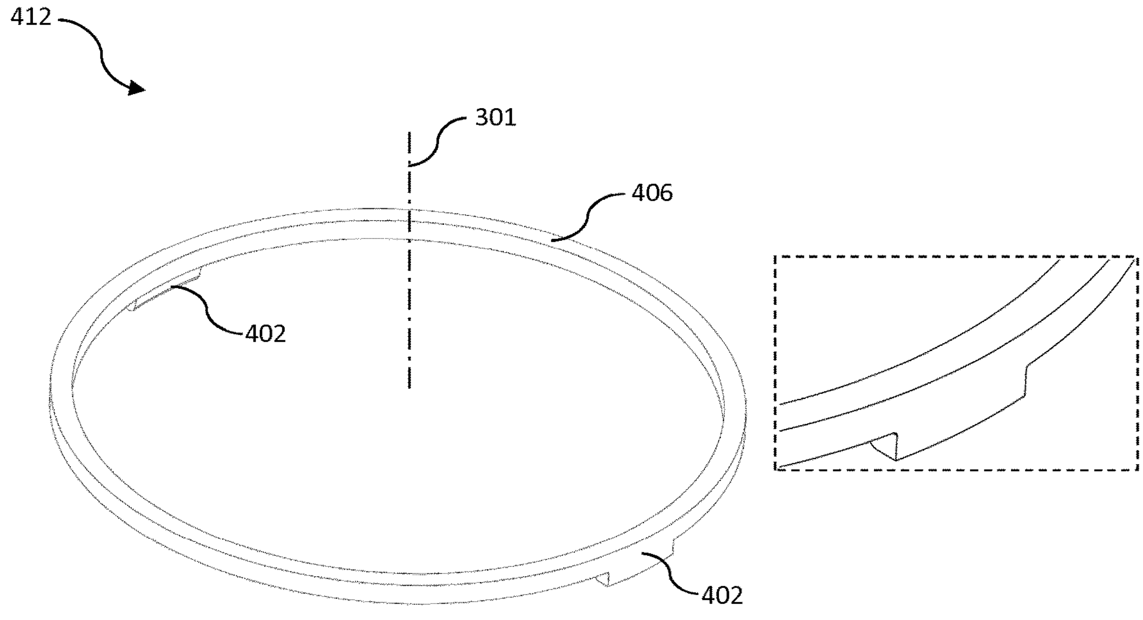
FIG. 4A is a perspective view of a ring of the spacer of FIG. 3 according to a specific implementation of the present invention.
Figure 4B:
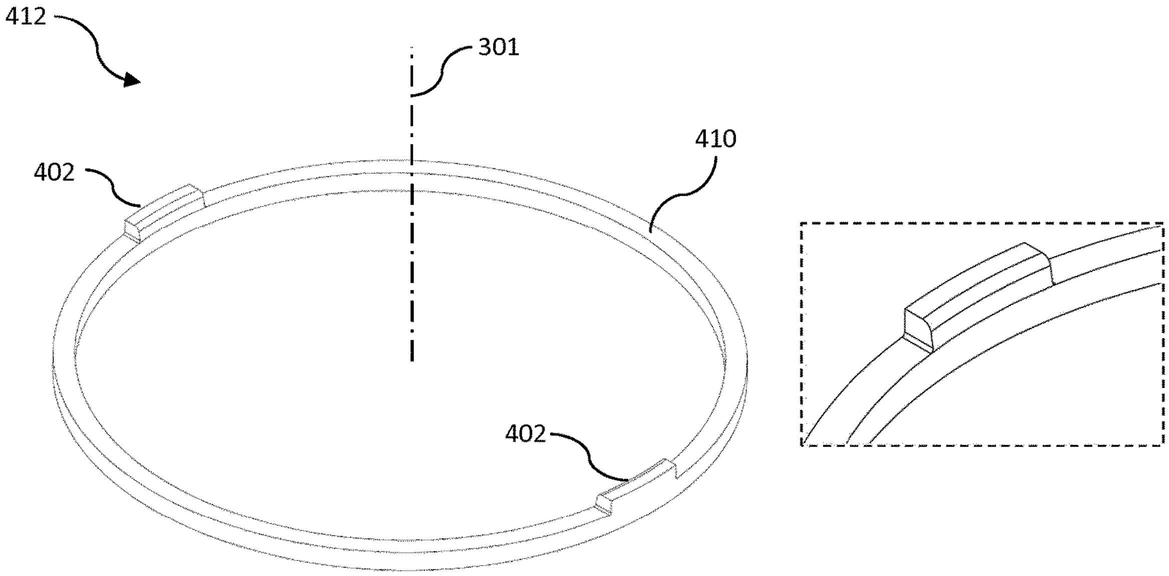
FIG. 4B is another perspective view of the ring of FIG. 4A.
Figure 4C:
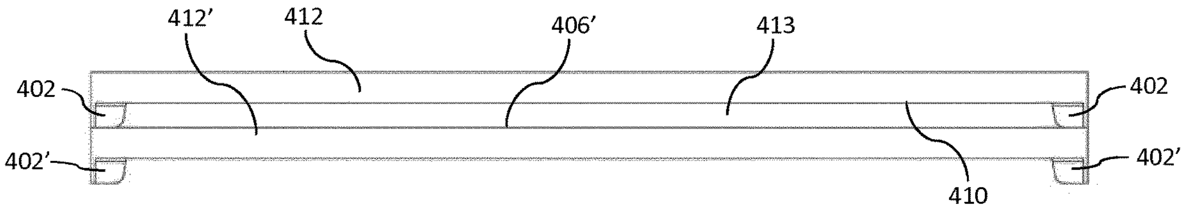
FIG. 4C is a side view of two overlaid rings of FIGS. 4A and 4B.
Figure 4D:
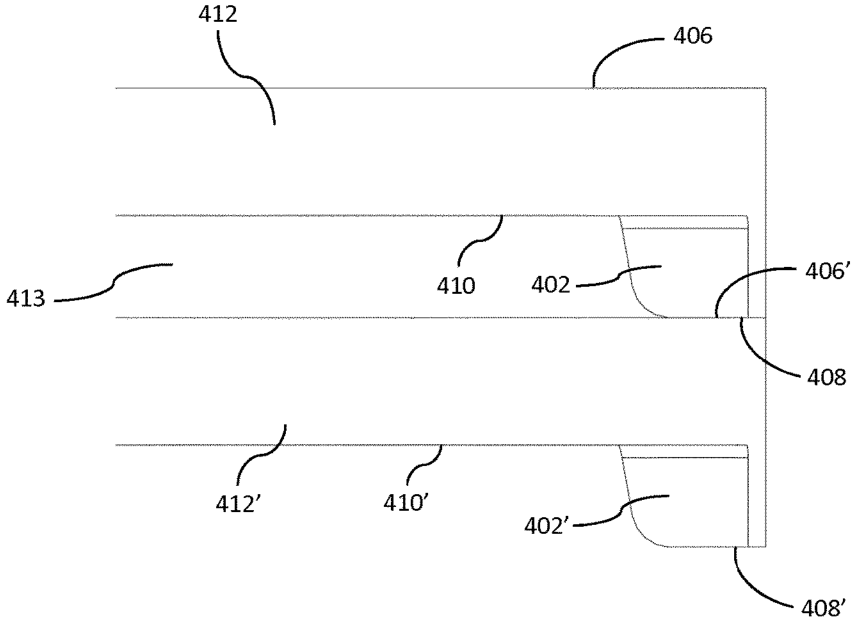
FIG. 4D is an enlarged view on protrusions of the two overlaid rings of FIG. 4C.

Referring to FIGS. 4A-4D, elements 412 are rings having at least one protrusion 402. FIG. 4A is a perspective view of a ring 412 of the spacer 300 of FIG. 3 according to a specific implementation of the present invention. FIG. 4B is another perspective view of the ring 412 of FIG. 4A. FIG. 4C is a side view of two overlaid rings 412, 412' of FIGS. 4A and 4B. FIG. 4D is an enlarged view on protrusions 402, 402' of the two overlaid rings 412, 412' of FIG. 4C.

Advantageously, cemented carbides in ring shape is more cost efficient than e.g., cemented carbides in a solid cylinder shape, and multiple rings on top of one another provide maximized contact area for the metallurgical bonding than e.g., a solid cylinder, to substantially provide the same wear resistant area.

In the embodiment of FIGS. 4A and 4B, the ring 412 has two protrusions 402 protruding axially at different axial positions on the ring 412. The protrusions 402 can be clearly observed from the enlarged view in FIGS. 4A and 4B. Referring to FIGS. 4C and 4D, two rings 412 and 412' are overlaid and axially spaced apart by a certain distance due to the protrusions 402. As shown in the enlarged section as shown in FIG. 4D, one of the protrusions 402 projects axially from the bottom annular surface 410 of the ring 412 and in a direction away from the top annular surface 406 of the ring 412. The bottom surface 408 of the protrusion 402 is arranged on the top annular surface 406' of the next ring 412' to provide the required distance between the rings 412 and 412' to allow the fourth material (e.g., matrix material), indicated by numeral 413 to fit in between the rings 412, 412'. The matrix material fit of 413 contacts the bottom annular surface 410 of the ring 412, and the top annular surface 406' of the ring 412', and thus metallurgical bonding can be created at the contact area.

In a more specific embodiment, the spacer 300 includes a plurality of rings 412 on top of one another, thus the fourth material fit in each two adjacent rings 412, this may provide a maximized metallurgical bonding inside the main body 304 of the spacer 300 as a maximized surface area is created for the two materials to bond, and advantageously, the spacer 300 has improved wear resistance, especially on the main body 304 of the spacer 300 where the feed materials are more frequently contacted.

Referring to FIGS. 5A-5D, the rings 512 and 512' are similar to the rings 412 and 412' as shown in FIGS. 4A-4D, except that in the embodiment of FIGS. 5A-5D, the rings 512 and/or 512' include at least one protrusion 502 and at least one side protrusion 504, wherein the side protrusions 504 on a plurality of rings 512/512' are arranged on top of one another to form the at least one ridge 308 (FIG. 3). Each of the ridges 308 extend radially and/or axially on the outer surface 303 in a way that the ridges 308 are arranged circumferentially along the outer surface 303. By way of example, two ridges 308 can be arranged oppositely on the outer surface 303 of the main body 304.

Figure 5A:
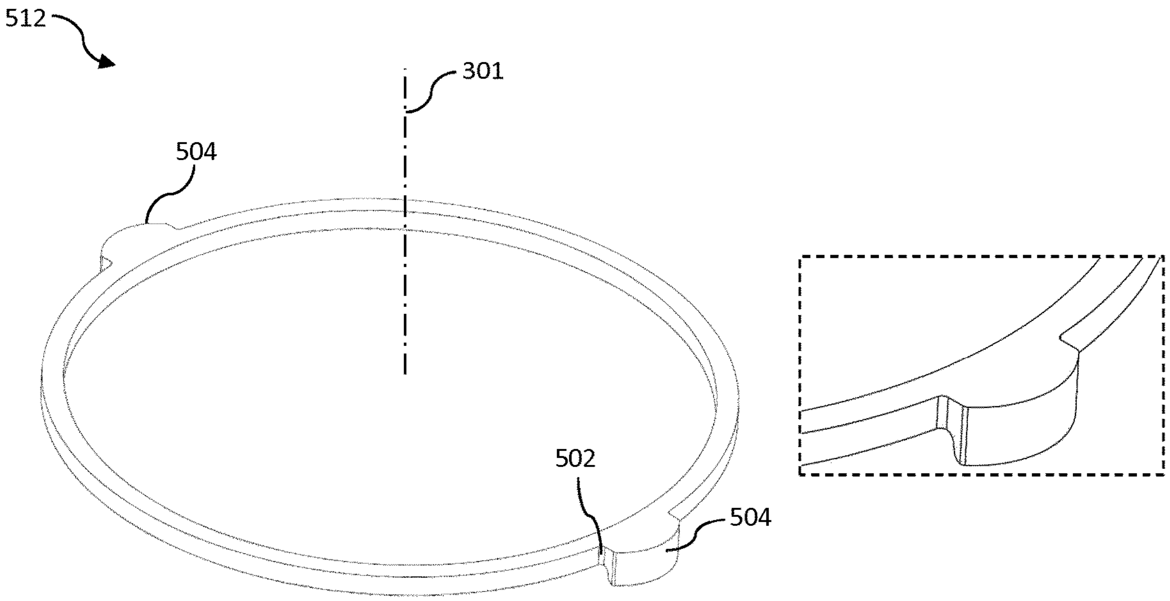
FIG. 5A is a perspective view of a ring of the spacer of FIG. 3 according to another specific implementation of the present invention.
Figure 5B:
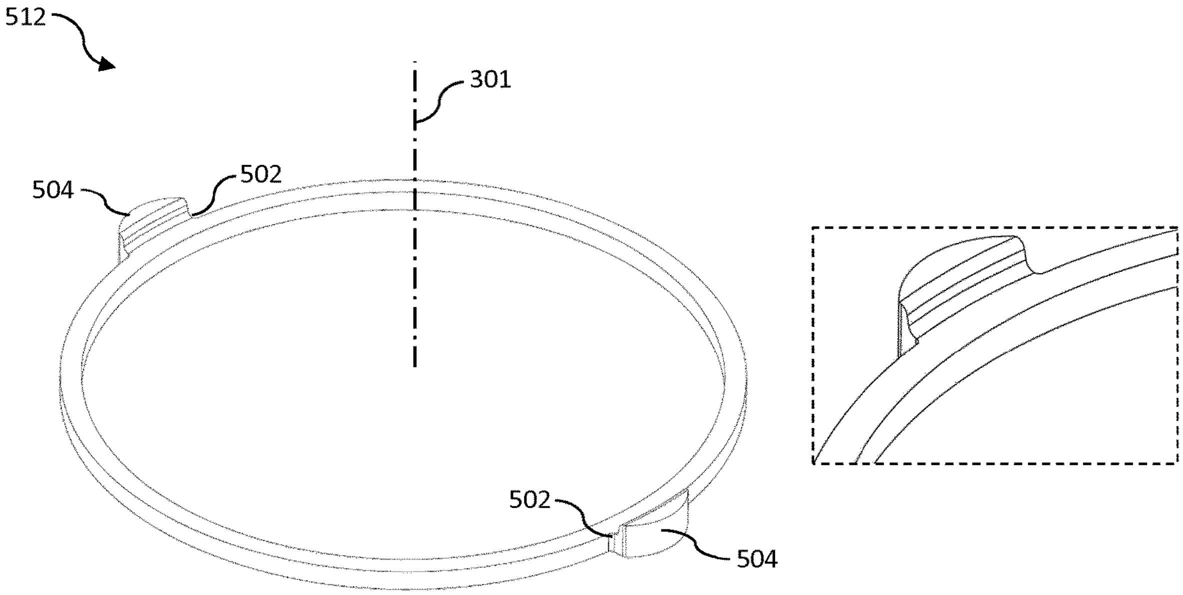
FIG. 5B is another perspective view of the ring of FIG. 5A.
Figure 5C:
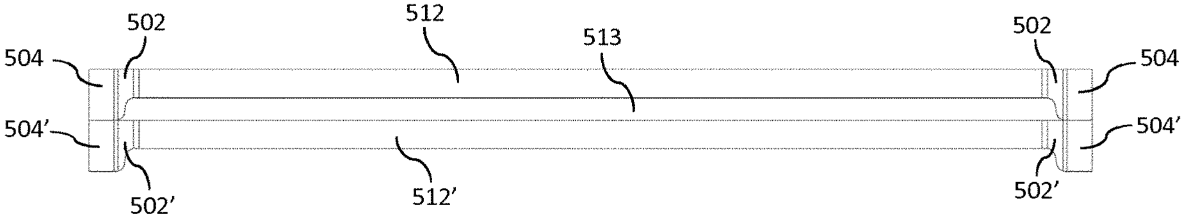
FIG. 5C is a side view of two overlaid rings of FIGS. 5A and 5B.
Figure 5D:
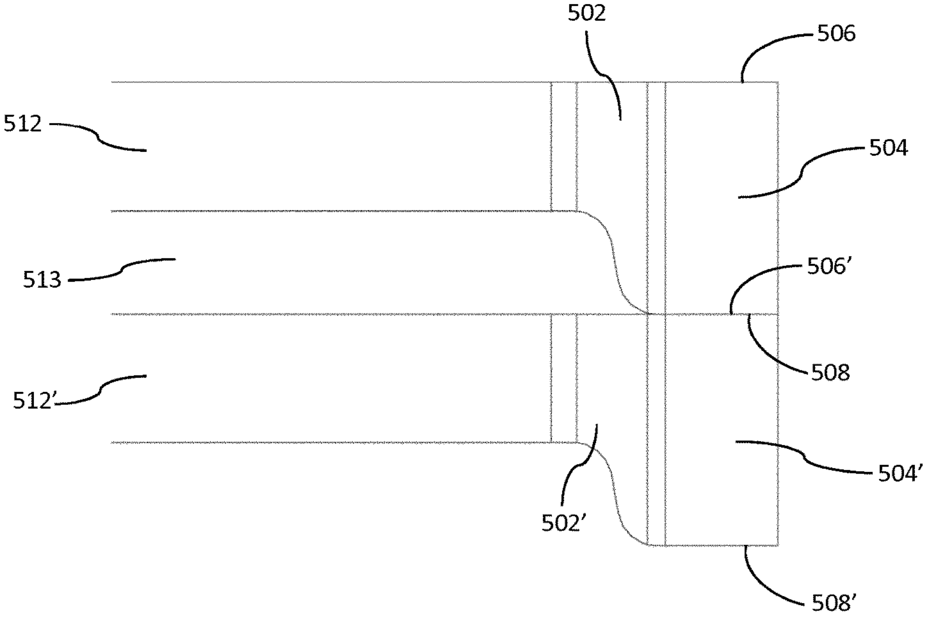
FIG. 5D is an enlarged view on the side protrusions of the two overlaid rings of FIG. 5C.

FIG. 5A is a perspective view of a ring 512 of the spacer 300 of FIG. 3 according to another specific implementation of the present invention. FIG. 5B is another perspective view of the ring 512 of FIG. 5A. FIG. 5C is a side view of two overlaid rings 512, 512' of FIGS. 5A and 5B. FIG. 5D is an enlarged view on side protrusions 504, 504' and protrusions 502, 502' of the two overlaid rings 512, 512' of FIG. 5C.

In the embodiment of FIGS. 5A and 5B, the ring 512 has two protrusions 502 protruding axially at different axial positions on the ring 512. In one embodiment, the protrusions 502 may be of the same shape as the protrusions 402 as shown in FIGS. 4A-4D, while in another embodiment, the protrusions 502 may be different from the protrusions 402. As shown in the embodiment of FIGS. 5A-5D, the protrusions 502 are thinner in the radial direction when compared to the protrusions 402 and protrude from the ring 512 in the axial direction so as to create a gap 513 in-between the ring 512 and the next ring 512'.

Referring to FIGS. 5A and 5B again, the ring 512 further includes two side protrusions 504 protruding radially outward of the outer surface 303 of the main body 304 (FIG. 3) at different radial positions. The side protrusions 504 can generally be of a curved shape with the middle part wider and the two ends pointed. In the other embodiments, the side protrusion 504 can be generally cuboid shaped as long as it protrudes from the outer surface 303 of the main body 304 to form at least one ridge, e.g., the ridge 308 extending axially and/or radially on the outer surface 303 of the main body 304. Both protrusions 502 and side protrusions 504 are made of the third material, so that the protrusions 502, the side protrusions 504, and the ring 512 form an integrated part.

In the embodiment of FIGS. 5A-5D, the side protrusions 504 protrude at the same radial position with a corresponding protrusion 502, however, it should be appreciated that the side protrusions 504 protrude at a different radial position from any of the protrusions 502, without deviating from the scope of the present invention. The protrusions 502 and the side protrusions 504 can be clearly observed from the enlarged view in FIGS. 5A and 5B.

Referring to FIGS. 5C and 5D, two rings 512 and 512' are overlaid and axially spaced apart by a certain distance due to the protrusions 502 and the side protrusions 504. As shown in the enlarged section of FIG. 5D, one of the protrusions 502 and side protrusion 504 projects axially from the ring 512 away from the top annual surface 506 of the ring 512. The bottom end of the protrusion 502 and the bottom surface 508 of the side protrusion 504 are arranged to engage with the top surface 506' of the next ring 512' to provide the required distance between the rings 512 and 512' to allow the channel 513 to be formed between the rings 512, 512' to accommodate the fourth material (e.g., matrix material) therein. The embodiments of FIGS. 5C and 5D are similar to the embodiments of FIGS. 4C and 4D, and similar numeral refers to similar components with similar functions and will not be illustrated in further detail herein.

Referring to FIGS. 3, 5A and 5B together, the rings 512 and 512' are further extended radially at the two ends where the side protrusions 504 protrude from the outer surface 303 of the main body 304 of the spacer 300. The side protrusions 504 form at least one ridge 308 in FIG. 3, The ridge 308 extends radially from the outer surface 303 and may further extend axially on the outer surface 303 of the main body 304. The bottom annular surface 508 of the ring 512 can be partially contacted with the top surface 506' of the subsequent ring 512', such that the ridge 308 is inclined and extended axially on the outer surface 303 of the main body 304 (FIG. 3).

By way of example, the diagonal extension of the two ridges 308 (FIG. 3), and the diagonal extension of the ridges 608, 708 (FIGS. 6 and 7) are formed, as shown in FIGS. 5C and 5D, by having the side protrusion 504 arranged on top of the consecutive side protrusion 504' and further by having the side protrusion 504 displaced radially from the consecutive side protrusion 504'.

The main body 304 of the spacer 300 includes a plurality of rings 512 each having one side protrusion 504 that are overlaid one by one to form the ridge 308, so that the ridge 308 is extended axially along the outer surface 303 and further inclined from the first axial end 305 on the top side of the main body 304 to the second axial end 307 on the bottom side of the main body 304. In another embodiment, the main body 304 of the spacer 300 includes a plurality of rings 512 each having two or more side protrusions 504 separated by substantially the same radial distance on a corresponding ring 512, the corresponding side protrusions 504 on the rings 512 are overlaid one by one to form two or more ridges 508, each of the ridges 508 being extended radially and/or axially on the outer surface 503 in a way that the ridges 508 are spread circumferentially along the outer surface 503.

According to a specific implementation, the ridge 508 formed by the side protrusions 504 of the overlaid rings 512 is made of cemented carbide, the ridge 508 further adjoins with the fourth material, e.g., the matrix material, to enable the ridge 508 being metallurgically bonded and thus has an improved wear resistance.

Figure 6:
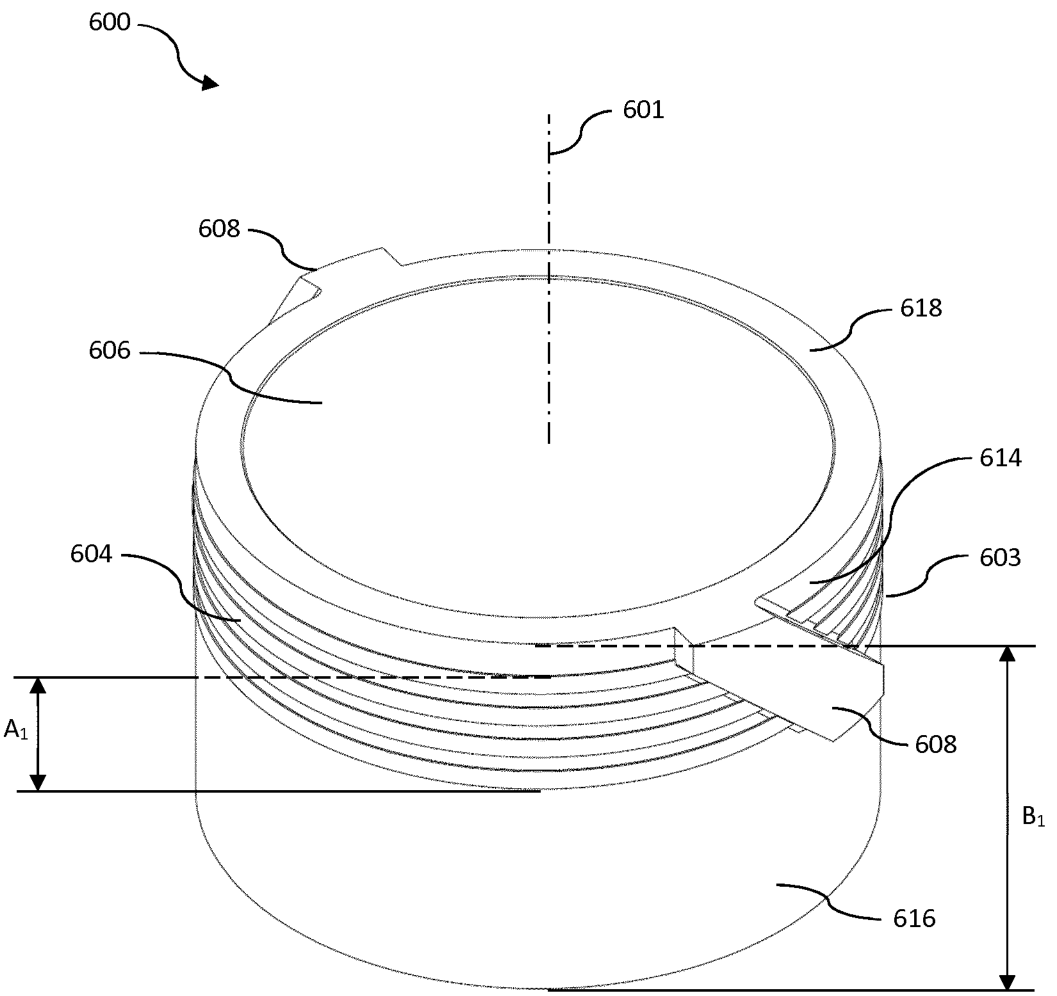
FIG. 6 is a perspective view of the spacer of a roller screen according to another specific implementation of the present invention.
Figure 7:
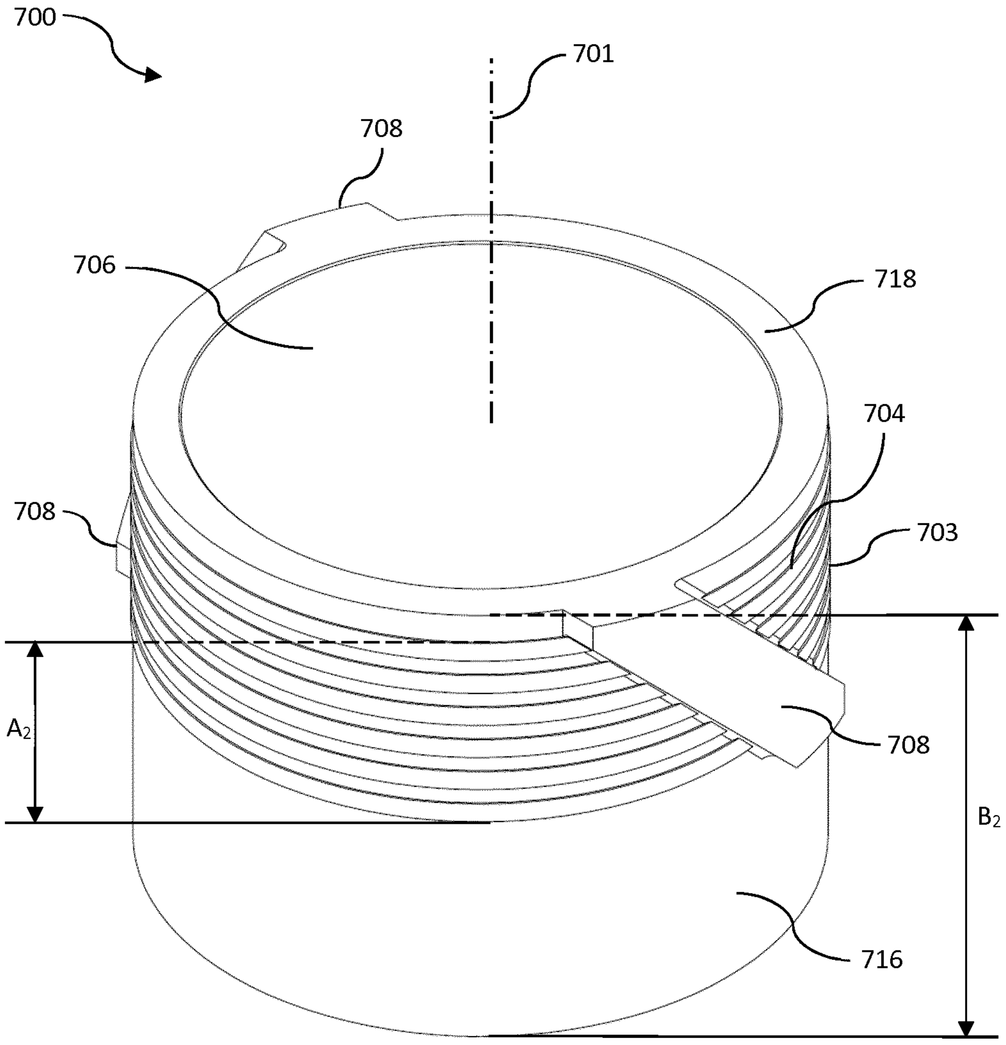
FIG. 7 is a perspective view of the spacer of a roller screen according to another specific implementation of the present invention.

Referring to FIGS. 6-7, spacers 600 and 700 according to the embodiments of the present invention are further provided. FIG. 6 is a perspective view of the spacer 600 of a roller screen according to a specific implementation of the present invention. FIG. 7 is a perspective view of the spacer 700 of a roller screen according to another specific implementation of the present invention. The spacers 600 and 700 are arranged for cooperation with the disc 100 on the roller screen for the transportation of feed materials. The spacers 600 and 700 are similar with the spacer 300 as shown in FIG. 3 and described above, similar labels of the spacers 600 and 700 have similar structures and functions as in the spacer 300.

In the embodiment of FIG. 6, the spacer 600 includes a first extending portion 614 extended axially around an axis 601 from an upper end of a main body 604, and further includes a second extending portion 616 extended axially around the axis 601 from a lower end of the main body 604. A centrally arranged passage 606 in the spacer 600 is generally cylindrical, so that a shaft may pass through when assembled. Preferably in this embodiment, two ridges 608 are arranged extending along the main body 604, and one end of each ridge 608 further extends axially onto the extending portion 614 until the top annular surface 618 of the extending portion 614. Advantageously, the elongated ridges 608 further improve the wear resistance of the spacer 600 so that the lifetime of the spacer 600 can be increased.

In one embodiment, the ridges 608 are formed by the side protrusions 504 arranged on top of one another, each of the protrusions 504 further staggered radially, in the same radial direction, a little bit from the adjacent side protrusion, such that the diagonal extension of the ridges 608 is formed on the outer surface 603 of the spacer 600. In one embodiment of FIG. 6, the spacer 600 is arranged as an end spacer installed at the two opposite ends on the shaft of the roller screen. As end spacers are most distant away from the centre of shaft of the roller screen, the wear resistance requirement is not the highest, in FIG. 6, the axial length $A_1$ of the main body 604 is arranged at about 25% of the axial length $B_1$ of the spacer 600. Advantageously, such arrangement reduces cost and simultaneously guarantees the wear resistance requirement of the end spacers.

In the embodiment of FIG. 7, the spacer 700 includes an extending portion 716 extended axially around an axis 701 from a lower end of the main body 704. A centrally arranged passage 706 in the spacer 700 is generally cylindrical, so that a shaft (not shown) may pass through when assembled. Two ridges 708 are arranged extending along the main body 704 and reach to the top surface 718 of the main body 704. In one embodiment, the ridges 708 are formed by the side protrusions 504 arranged on top of one another, a consecutive protrusion 504 being radially somewhat staggered or displaced, in the same radial direction, a little bit from the preceding side protrusion, such that the diagonal extension of the ridges 708 is formed on the outer surface 703 of the spacer 700.

The spacer 700 can be arranged as an end spacer installed at the two opposite ends on the shaft of the roller screen, with the axial length $A_2$ of the main body 704 is arranged at 25-50% of the axial length $B_2$ of the spacer 700. Advantageously, such arrangement reduces cost and simultaneously guaranteed the wear resistance requirement of the end spacers.

Figure 8:
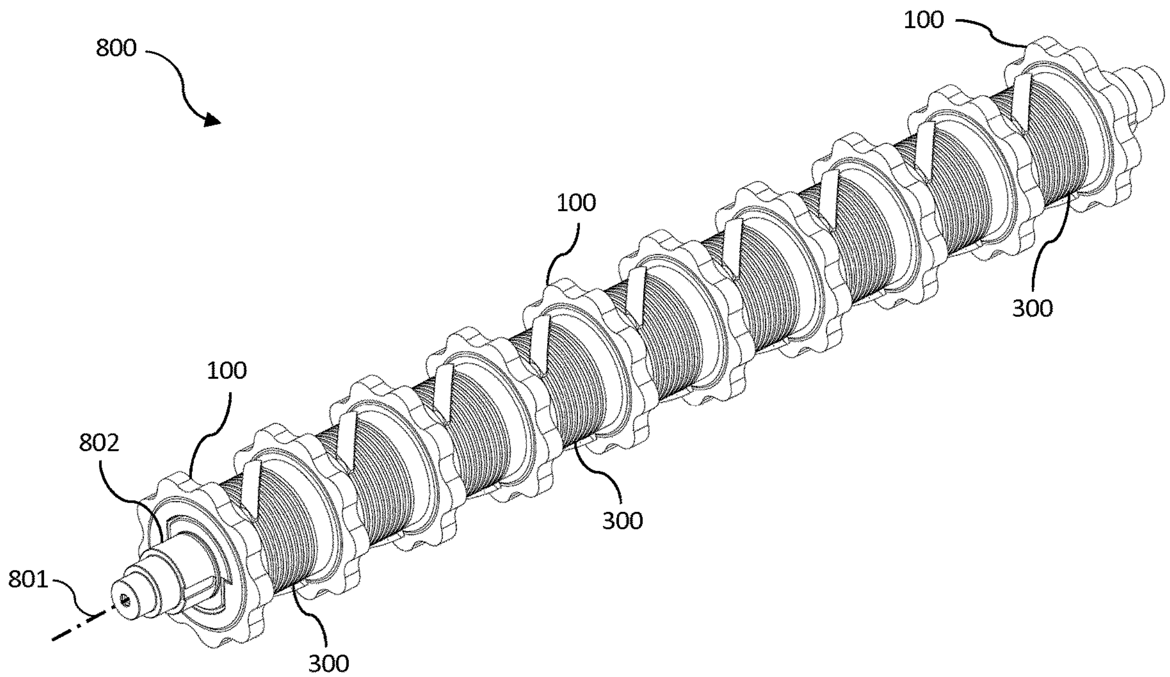
FIG. 8 is a perspective view of an assembly of the discs of FIG. 1 and the spacers of FIG. 3 in cooperation on a shaft of a roller screen.
Figure 9:
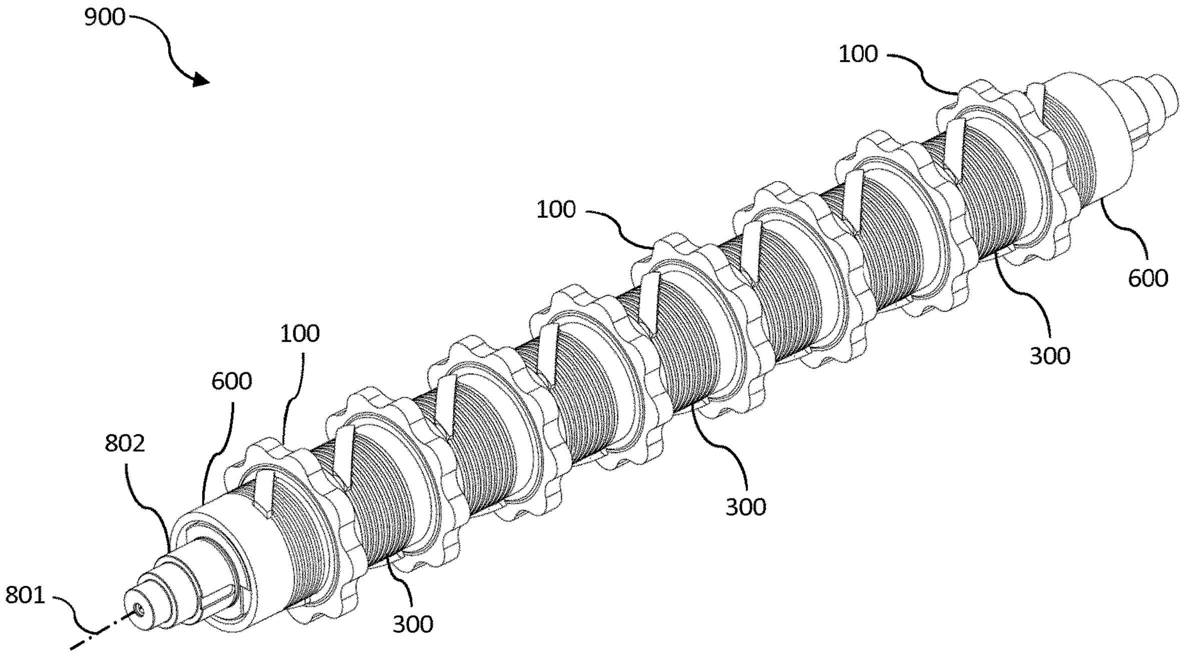
FIG. 9 is a perspective view of an assembly of the discs of FIG. 1 and the spacers of FIG. 6 in cooperation on a shaft of a roller screen.

FIG. 8 is a perspective view of an assembly 800 of the discs 100 and the spacers 300 in cooperation on a shaft 802 of a roller screen. FIG. 9 is a perspective view of an assembly 900 of the discs 100 and the spacers 300, 600 in cooperation on a shaft 802 of a roller screen. As shown in the assemblies 800 and 900, the shaft 802 has a rotational axis 801 along which the shaft 802 extends and is installed with a plurality of the discs 100 and a plurality of the spacers 300, 600. More specifically, the discs 100 and the spacers 300, 600 are installed on the shaft 802 through each opening 106 of the transportation elements 100, and each passage 306, 606 of the spacers 300, 600. The discs 100 and the spacers 300 are assembled one by one and side by side, and the spacers 600 are assembly on the two opposite ends of the shaft 802. In one embodiment, each two adjacent discs 100 are separated by one of the spacers 300. Referring to FIGS. 8 and 9, the assembly 800 in the embodiment is configured so that the axis 101 of the discs 100, the axis 301 of the spacers 300, the axis 601 of the spacers 600, and the rotational axis 801 of the shaft 802 are generally coincided, so that the discs 100 and the spacers 300, 600 can be located concentrically around the shaft 802. The rotation of the assembly enables the transportation of feed materials on the roller screen.

Moreover, in the embodiment of FIG. 8, on the opposite ends of the shaft 802, one more disc 100 is installed as an end disc. It is beneficial as the end discs further helps in the transportation of feed materials at around the ends of the shaft 802. In the embodiment of FIG. 9, on the opposite ends of the shaft 802, two end spacers are respectively installed on the shaft 802. It is beneficial to use the end spacers as it guaranteed the wear resistant requirement at the end of the shaft 802 and at the same time reduces the cost of spacers; however, it will not be used as a limitation of the present invention, in another embodiment of the present invention, the end spacers can be the same as intermediate spacers, e.g., spacer 300, and the assembly of such will work as properly as the embodiments as shown in FIGS. 8 and 9.

As mentioned above, the wear resistant portion 102 of the disc 100 is made of cemented carbides metallurgically bonded to the matrix material, and preferably, cemented carbides metallurgically bonded to spheroidal cast iron or high-chromium iron, the wear resistance of the disc 100 is improved, and the lifetime is thus increased. Also, in the embodiments of the present invention, the axial length of the main body is in a range 25%-100% of an axial length of the spacer. Since the main body of the spacer is made of cemented carbides metallurgically bonded to the matrix material, by configuring the main body in the range 25%-100% enables the spacer with increased wear resistance, and a longer service lifespan. By way of example, for a roller screen transporting coal as feed materials, the roller screen is adapted with the disc 100 and the spacer 300, 600, or 700 of the present invention, assembled on the shaft of the roller screen, under typical operating loads with coal as feed materials, the disc and the spacer as described in the present invention is expected to last around or more than 24 months, the lifetime of which is largely increased than the existing transportation and spacer in the art, which is about half the lifetime of those in the present invention.

Although in the embodiments of FIGS. 8-9, in the assemblies 800 and 900, the spacer 300, 600 is assembled with the disc 800 on the shaft 802, other embodiments of discs and spacers within the scope of protection of the present invention can also be assembled on the shaft to provide similar functions and advantages. By way of example, the spacers 700 can be configured to be installed as end spacers on the shaft 802 with the disc 100.

The invention claimed is:

1. A disc arranged for cooperating with a spacer for transporting materials on a roller screen, the disc comprising:

a circular main body having a centrally arranged opening, through which opening a centrally arranged axis extends; and a wear resistant portion arranged around the circular main body, wherein the wear resistant portion includes a plurality of protuberances circumferentially arranged along a periphery of the wear resistant portion, the plurality of protuberances projecting radially outward from the main body, wherein the wear resistant portion includes a first material and the main body includes a second material, the first and second materials having different wear resistant properties, wherein the wear resistance of the first material is greater than the wear resistance of the second material, wherein the first material is bonded with the second material so that the wear resistant portion and the main body are integrated, and wherein the second material includes a matrix material, and the first material includes cemented carbides metallurgically bonded to the matrix material.

2. The disc as claimed in claim 1, wherein the wear resistant portion further includes a plurality of segments arranged on a radially outermost region of the protuberances, wherein the protuberances are made of the matrix material and the plurality of segments are made of the cemented carbides, such that the plurality of segments are metallurgically bonded to teeth of the protuberances.

3. The disc as claimed in claim 1, wherein the cemented carbides in the wear resistant portion are selected from at least one of granules, balls, and/or cubes, metallurgically bonding to the matrix material in the wear resistant portion.

4. The disc as claimed in claim 1, wherein the matrix material includes iron.

5. The disc as claimed in claim 4, wherein the iron is spheroidal cast iron or high-chromium iron.

6. A spacer arranged for cooperating with a disc including a first material and a second material, and for transporting materials on a roller screen, the spacer comprising:

a cylindrical main body having a first axial end, a second axial end, an outer surface and a centrally arranged passage, through which passage a centrally arranged axis extends; and at least one ridge extending axially and/or radially on the outer surface of the main body, wherein the at least one ridge includes a third material, the main body including the third material and/or a fourth material, the third and fourth materials having different wear resistant properties, wherein the wear resistance of the third material is greater than the wear resistance of the fourth material, wherein the third material is bonded with the fourth material so that the main body and the at least one ridge are integrated, and wherein the fourth material includes a matrix material, and the third material includes cemented carbides that are metallurgically bonded to the matrix material.

7. The spacer as claimed in claim 6, wherein the matrix material includes iron.

8. The spacer as claimed in claim 7, wherein the iron is spheroidal cast iron or high-chromium iron.

9. The spacer as claimed in claim 6, wherein the main body includes at least two elements that are made of the third material, the at least two elements being arranged on top of each other such that the main body is cylindrical.

10. The spacer as claimed in claim 9, wherein one of the elements includes an axially projected protrusion, the protrusion being arranged to engage with a subsequent element.

11. The spacer as claimed in claim 9, wherein each of the elements includes a side protrusion protruding radially outward of the outer surface, wherein the side protrusion forms at least partially the at least one ridge on the outer surface of the main body.

12. The spacer as claimed in claim 11, wherein the at least one ridge is formed by the side protrusions of the elements that are metallurgically bonded with the fourth material.

13. The spacer as claimed in claim 6, wherein the spacer further includes an extending portion extending axially from a first axial end or a second axial end of the main body, the extending portion being generally cylindrical and made of the fourth material.

14. The spacer as claimed in claim 13, wherein the at least one ridge is further extended axially and/or radially on the extending portion.

15. The spacer as claimed in claim 6, wherein an axial length of the main body is in a range 25%-100% of an axial length of the spacer.

16. A transportation assembly for transportation of materials, comprising:

a shaft having a rotational axis;

a plurality of discs as claimed in claim 1, wherein the plurality of discs are installed on the shaft through the openings of the discs; and a plurality of spacers, each of the plurality of spacers including a cylindrical main body having a first axial end, a second axial end, an outer surface and a centrally arranged passage, through which passage a centrally arranged axis extends, and at least one ridge extending axially and/or radially on the outer surface of the main body, wherein the at least one ridge-includes a third material, the main body including the third material and/or a fourth material, the third and fourth materials having different wear resistant properties, wherein the plurality of spacers are installed on the shaft through the passages of the spacers, and wherein two adjacent discs are separated by one of the spacers.

17. The transportation assembly as claimed in claim 16, wherein the axis of the discs, the axis of the spacers, and the rotational axis of the shaft generally coincide, so that the discs and the spacers are located concentrically on the shaft.

* * * * *